Feb. 10, 1953  J. MacKENZIE  2,628,000
RANGE SEEDER
Filed March 9, 1951

INVENTOR.
JAMES MacKENZIE
BY Willard S. Groen
ATTORNEY

Patented Feb. 10, 1953

2,628,000

UNITED STATES PATENT OFFICE 2,628,000

RANGE SEEDER

James MacKenzie, Glenwood Springs, Colo., assignor, by direct and mesne assignments, to Southwest Metal Industries, Phoenix, Ariz., a corporation of Arizona Application March 9, 1951, Serial No. 214,797

6 Claims. (Cl. 222—162)

This invention pertains to range seeders and is particularly directed to a device for use in conjunction with cattle on the range to distribute seeds to resow a depleted range to maintain a continuous growth of grass and the like.

It has long been known that if range land could be properly reseeded to offset the using up of the range by cattle in feeding, that a continuous high efficiency of the range land could be maintained. The difficulty in the past has been that the reseeding operations have been highly inefficient and wasteful in that the seed could not be distributed in a manner that it would fall on fertile areas of ground, areas already productive of grassland. A good portion of the seed was lost in rocky non-fertile areas or wasted in brush, cactus and forested areas where the grassland could not develop properly.

One of the objects of the present invention is to provide a range seeder which automatically distributes the seed in the most fertile areas and the most likely places that grass could maintain itself after being so seeded.

Still another object of this invention is to provide a range seeder adapted for use with cattle on the range to automatically sow seed in areas where grass is already growing or has been growing and during the normal feeding activities of the cattle on the range.

Still another object of this invention is to provide a range seeder which may be attached to the necks of cattle and which automatically sows seed whenever the cattle reach down to eat grass or other edible plants so that the seed will thus be presented to soil areas already favorable to the growth of grass.

Still another object of this invention is to provide a range seeder comprising a receptacle which may be readily filled with the desired range seed and attached to a collar on a cow's neck, said seeder incorporating mechanism to automatically cause seed to be dropped on the ground in measured desired amounts whenever the cow reaches down to eat some grass or the like.

Further features and advantages of this invention will appear from a detailed description of the drawings in which.

Figure 2:
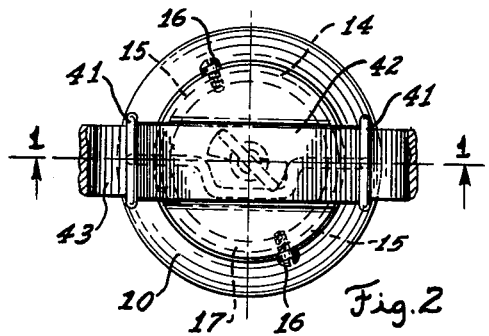
Fig. 2 is a plan view of the range seeder shown in Fig. 1.

The range seeder comprises a lower receptacle portion 10 having a bottom 11 rigidly secured in place by any suitable sealing or welded material at 12, the upper portion of the member 10 having a reduced diameter surface 13 formed integral therewith over which nicely slidably fits the closure or cap portion 14. The member 14 is secured in place by means of suitable bayonet lock slots 15 in which operate screws 16 secured in the portion 17 forming the surface 13 of the top of the container 10. A suitable soft rubber gasket 18 is provided between the ledge 19 of the member 10 and the lip 20 of the cover cap 14.

Figure 5:
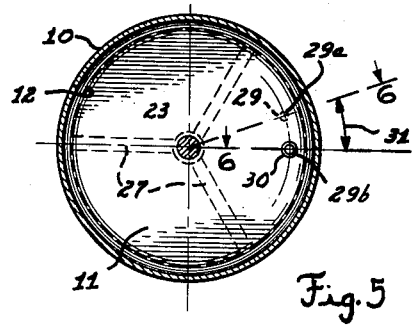
Fig. 5 is a bottom sectional view on the line 5—5 of Fig. 3.

A disc member 21 is formed integral with the vertical actuating shaft 22 and is journaled at its lower end on a trunnion 23 in the bottom 11 of the container 10. The lower surface 24 of the disc nicely slidingly engages the surface 25 of the bottom portion 11 and has supporting angularly disposed arms 27 formed integral with the disc 21 and the vertical actuating shaft 22 to give rigidity and perfect alignment of the disc 21 with the bottom 11 and to keep the seeds continuously agitated, to prevent packing of the seeds and assure their free flow at all times. The edge 11a of the disc 21 preferably operates in a recess 28a formed in the inside surface of the member 10 to provide a seal between the seed carrying chamber 28 to prevent any seed getting between the surfaces 24 and 25 of the device. A seed discharge opening 29 is formed in the disc 21 which is in registry with a discharge opening 30 formed in the bottom member 11. The two holes become in alignment when the disc 21 rotates through a predetermined small arc 31 indicated in Fig. 5.

In order to actuate the disc 21 in arcuate motion to momentarily bring the openings 29 and 30 into alignment to allow seed 32 in the chamber 28 to drop through the holes on to the ground, there is provided a flattened cam portion 33 formed integral with the shaft 22 above its upper bearing support 34 in the upper supporting disc 35 secured to the member 10. Suitable cutaway portions 35a are provided in the disc 35 to permit easy placement of seed 32 in the chamber 28 below the disc 35.

Figure 4:
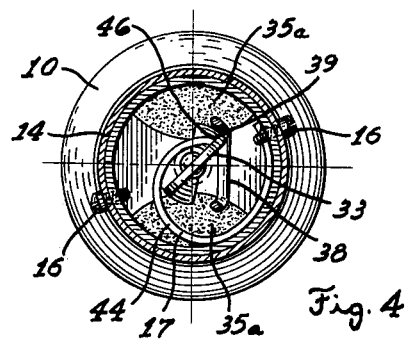
Fig. 4 is a horizontal sectional view on the line 4—4 of Fig. 3.
Figures 1, 6:
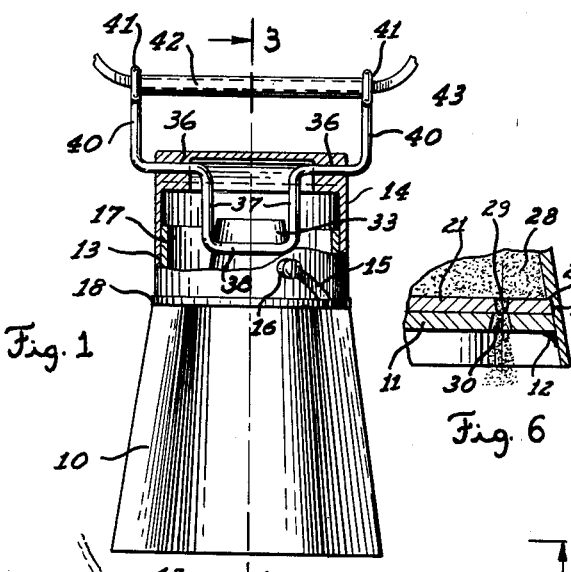
Fig. 1 is a front elevation of the range seeder shown partly in section on the line 1—1 of Fig. 2.
Fig. 6 is a fragmentary enlarged view on the line 6—6 of Fig. 5.
Figure 3:
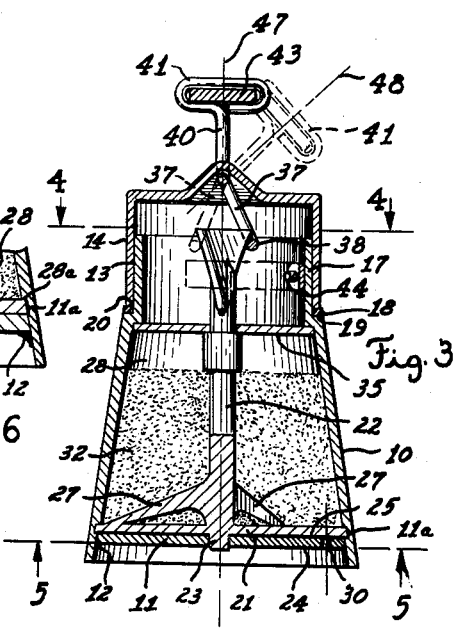
Fig. 3 is a vertical sectional view on the line 3—3 of Fig. 1.

Journaled in suitable bearings 36 in the cap member 14 is the actuating lever comprising the downwardly extending U-shaped portions 37 and the horizontally disposed member 38, the portion 38 of which engages one edge 39 of the flattened portion 33 of the shaft 22. The upper portion of the actuating lever has upstanding arms 40 which terminate in flattened elongated eyes 41 in which is secured the collar strap supporting tube 42 through which passes the collar strap 43 of the collar around the animal's neck. A biasing spring 44 secured by one of the screws 16 in the portion 17 of the receptacle 10 contacts its end portion 46 with the flattened end portion 33 of the shaft 22 to normally bias and rotate the shaft 22 in a clockwise direction as seen in Fig. 4 so as to normally hold the discharge opening 29 in the position 29a shown in Fig. 5, not aligned with the discharge opening 30. When the actuating lever 40 is moved from its normal biased or closed position 47, Fig. 3, to the open or seeding position 48, the cross member 38 engaging the edge 39 of the flattened portion 33 causes the shaft 22 to rotate in a counterclockwise direction, Figs. 4 and 5, to thus rotate the disc 21 and bring the discharge opening 29 from position 29a to position 29b in alignment with the discharge opening 30 thus causing seed to be discharged from the chamber 28 on to the ground.

Figures 7, 8, 8A:
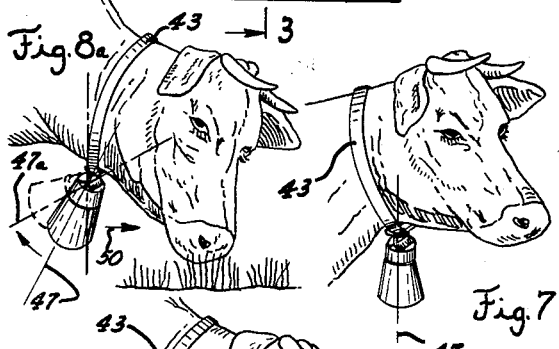
Fig. 7 is a view showing the range seeder attached to a cow's neck when she is normally standing or walking about and not eating.
Fig. 8 shows the range seeder in operation at the time the cow is reaching down eating grass.
Fig. 8a shows the seeder arranged for still another mode of operation from that of Fig. 8.

In Figs. 7 and 8 is shown one embodiment of this invention in which the collar strap 43 passes through the tubular member 42 and the eyes 41 of the actuating lever 40. When the animal or cow is normally standing with its head up and not eating, as shown in Fig. 7, the member 40 will be in vertical position indicated by the line 47 so that the openings 29 and 30 are closed relative to each other and no seed is being deposited from the device. When, however, the animal reaches down to eat some grass, as shown in Fig. 8, the collar strap 43 will naturally be tilted from a horizontal position to an angularly disposed position as indicated by the line 49 and due to the gravitational pull on the receptacle 10, it will tend to stay in a normally vertical position indicated by the line 47, so that the actuating lever member 40 will then become positioned in the line 48 causing its member 38 to actuate the shaft 22 and the disc 21 as described to bring the openings 29 and 30 in alignment and cause the seed 32 to be deposited on the ground surface. Since the openings 29 and 30 are only aligned at a particular position 48 for member 41 seed will only be intermittently dropped during each downward and upward movement of the animal. As the animal again raises its head to the position of Fig. 7 the parts will resume the normal position shown in Fig. 3 under the influence of the bias spring 44 so as to close off the openings 29 and 30 and prevent further droppage of seed.

Continued periodic downward and upward movement of the animal's neck causes the device to be thus operated by the inertia of the container portion 10 of the range seeder so that movement of the animal causes relative movement of the member 40 and the body of the device to effect the seeding operation.

The operation of the seeder is particularly effective during the outward and upward jerking motion of the cow's or animal's head when pulling grass while eating. In this arrangement the seeder is mounted as shown in Fig. 8a, so that it is free to swing backwardly instead of forwardly, as in Fig. 8. In this case the forward jerking motion in eating, as indicated by the arrow 50, causes the member 10 to relatively swing from position 47 to position 47a momentarily due to the inertia of the device, to thus momentarily deposit seed from the openings 29 and 30 with each eating forward jerk 50 of the animal. Thus in this manner seed is automatically deposited wherever the animal eats grass and therefore in a place proven of fertility and ability for the seed to propagate. As the animal walks along after having thus eaten and deposited seeds it will then trample them automatically into the ground so that their growing possibilities will be further greatly enhanced.

Having thus fully set forth and described this invention what is claimed as new and desired to be secured by United States Letters Patent is:

1. A range seeder comprising a seed receptacle, means for pivotally suspending said receptacle from the collar around an animal's neck, means in said receptacle actuable to discharge predetermined amounts of seed from said receptacle, and means operable by the relative pivotal movement of said receptacle and said first mentioned means by the position of the animal's neck to cause said discharge means to be actuated.

2. A range seeder comprising a seed carrying receptacle, actuable means in said receptacle for depositing predetermined amounts of seed from said receptacle on a ground surface, means for pivotally suspending said receptacle on an animal's collar, and means in conjunction with said last mentioned means operable by the relative movement of said receptacle and said second means during movement of said animal when eating from the ground surface to actuate said device to cause seed to be deposited on the ground.

3. A range seeder comprising a seed receptacle, means in said receptacle for depositing predetermined amounts of seed therefrom on the ground surface, an actuating lever for said last mentioned means, and means for connecting said lever to a collar around an animal's neck whereby the movement of said animal in reaching down to eat grass from the ground surface causes said actuating lever to operate said discharge means in said receptacle to cause seed to be deposited on the ground surface in the vicinity of the grass being eaten by said animal.

4. A range seeder comprising a seed receptacle, a bottom in said receptacle having a discharge opening, a disc rotatably mounted above said bottom having an entrance opening in alignment with said discharge opening when said disc is rotated to a predetermined position, a vertically disposed actuating shaft connected to said disc, a cover closure for said receptacle, an actuating lever including an arm member, a flatted cam portion on said actuating shaft engaged by said arm member, and means for connecting said actuating lever to a collar around an animal's neck whereby the movement of said animal's neck from a standing position to an eating position actuates said disc adjacent the bottom of said seed receptacle to cause seeds to be dropped on the ground area adjacent the grass being eaten by said animal.

5. A range seeding device comprising a seed receptacle, a movable discharge opening mechanism in the bottom of said receptacle actuable to deposit predetermined amounts of seed, and actuating mechanism for operating said last mentioned means having a lever arm arrangement adapted to be connected to a collar around an animal's neck, and means associated with said last mentioned means operable by the relative motion of said collar with respect to a normal vertical position of said receptacle causes said device to deposit seeds in predetermined amounts on the ground surface.

6. A range seeding device comprising a receptacle member, a bottom in said receptacle, a rotatable discharge disc mounted directly above said bottom, a receiving opening in said disc, a discharge opening in said bottom in alignment with said receiving opening in said disc when said disc is rotated to a predetermined position on said bottom, a vertically disposed actuating shaft formed integral with said disc and extending upwardly in said receptacle, supporting bearing means at the upper portion of said shaft, a flatted cam portion on the upper end of said shaft, a cover closure for said receptacle, means for sealing said closure to said receptacle, an actuating arm means journaled in said closure cover, means on said actuating means engaging said cam to rotate said shaft in one direction, a biasing spring fixed in said receptacle and engaging said flatted portion on said vertical shaft to normally bias said shaft in a direction opposed to the effect produced by said actuating lever, and means for connecting said actuating lever rigidly to an animal's collar whereby movement of said collar by movement of said animal's neck actuates said shaft and disc to precipitate seed in predetermined amounts on the ground surface whenever said animal is in eating position.

JAMES MacKENZIE.

REFERENCES CITED

The following references are of record in the file of this patent:

UNITED STATES PATENTS

| Number | Name | Date |
|---|---|---|
| 2,495,906 | Porter | Jan. 31, 1950 |

FOREIGN PATENTS

| Number | Country | Date |
|---|---|---|
| 509,990 | Germany | Oct. 15, 1930 |